N. C. Sanford,
Attaching Augers to Handles.
No. 15,147.   Patented June 17, 1856.
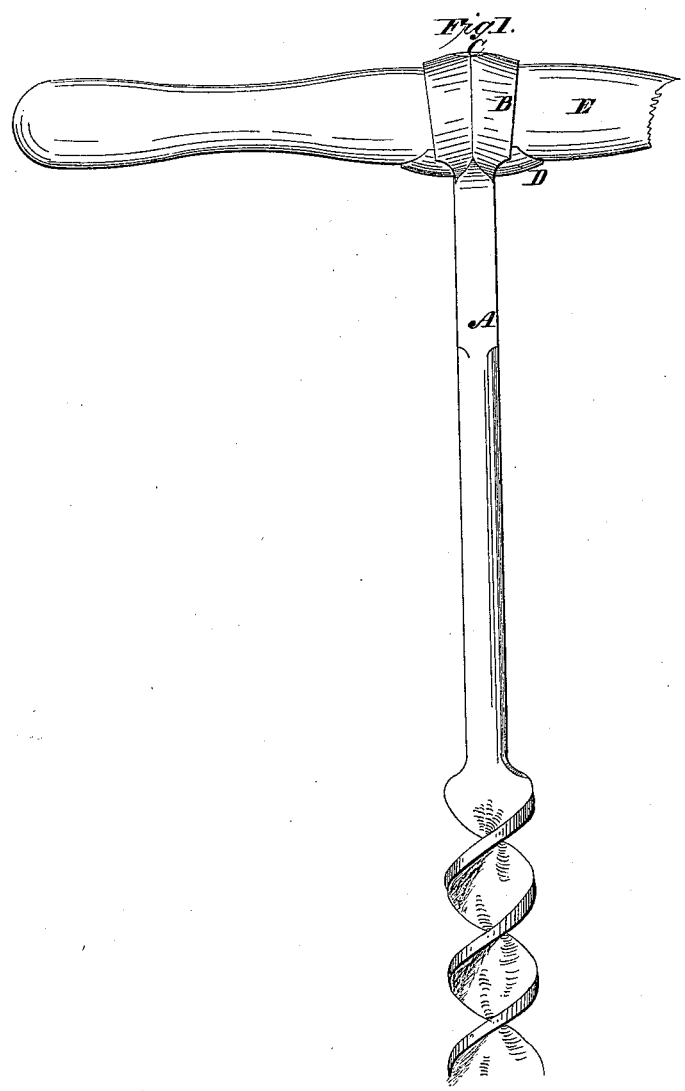
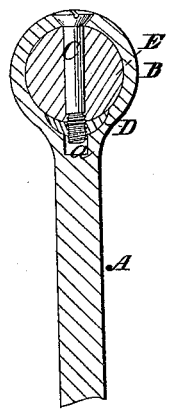

UNITED STATES PATENT OFFICE.

N. C. SANFORD, OF MERIDEN, CONNECTICUT.

AUGER-HANDLE.

Specification of Letters Patent No. 15,147, dated June 17, 1856.

*To all whom it may concern:*

Be it known that I, N. C. SANFORD, of Meriden, in the county of New Haven and State of Connecticut, have invented a new and useful Improvement in Securing Handles in Eye-Shank Augers; and I do hereby declare that the following is a full, clear, and exact description of the same, reference being had to the annexed drawings, making a part of this specification, in which—

Figure 1 is a side view of a handle secured to the auger, according to my improved plan. Fig. 2, is a transverse section of the handle, eye at the end of the shank of the auger, and the plate through which the screw passes.

Similar letters of reference indicate corresponding parts in the two figures.

In the annexed drawings A represents the shank of an auger having an eye B, formed in its end.

C, represents a screw which passes through the outer side of the eye B, and into a recess (a) in the end of the shank inside the eye, see Fig. 2.

D, is a metallic plate which is fitted within the eye B. This plate has a hole made through it, the hole having a screw thread cut in it, and the screw C, passes through the hole as clearly shown in Fig. 2.

E, represents the handle which is fitted in the eye B, the plate D, being on the under side of the handle. The screw C, passes through the handle.

From the above description it will be seen that by turning the screw C, the plate D, will be brought snugly up against the under side of the handle, which will in consequence be firmly secured in the eye. The plate D, is made of sufficient length to afford a good bearing for the handle, and any ordinary stick may be used for a handle without regard to thickness as the plate D, may be adjusted to handles of different thicknesses. A mechanic therefore may readily insert a handle of any required length, all that is required is to bore a hole through the stick used as a handle to allow the screw C, to pass through.

Were the screw C merely to enter the handle E, the handle would soon become loose in the eye of the shank, nor would the simple addition of the metal screw plate D altogether prevent this or prevent longitudinal play of the handle or shake of it in the eye, but this plate in connection with the point of the screw entering a recess (a) in the shank, secures a firm clamp to the stick or handle E, however much smaller its diameter relatively to the eye B, incapable of longitudinal play and end dip of the handle, relieves the screw of strainage and affords the greatest facility as specified for change of the handle and for any roughly made stick or handle being used.

What I claim as new and useful in augers having an eye for the passage and retention of the handle, and desire to secure by Letters Patent, is—

Fastening the stick or handle in the eye of the auger shank by means of the screw C passing through the eye B handle E and into a recess (a) in the shank, in combination with the clamp or screw plate D on the under side of the stick within the eye and operated by the screw as specified.

N. C. SANFORD.

Witnesses:
TILTON E. DOOLITTLE,
SAVILIAN R. HULL.